Aug. 22, 1967
G. V. BRYNSVOLD
3,337,257
GRAPPLING SYSTEM
Filed Oct. 7, 1965
2 Sheets-Sheet 1
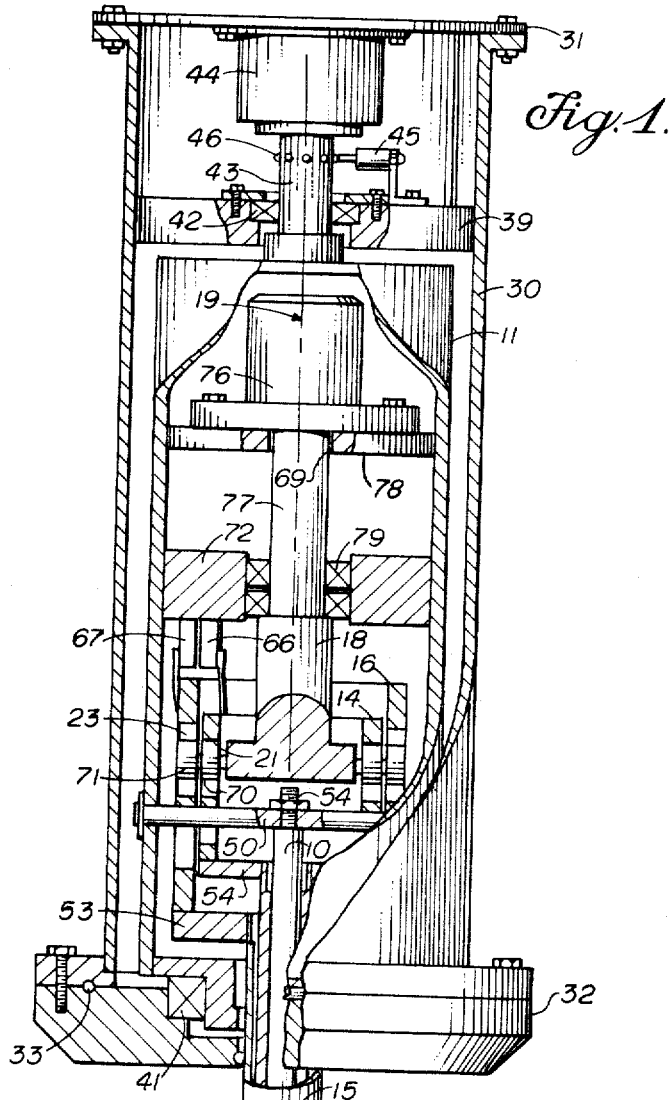
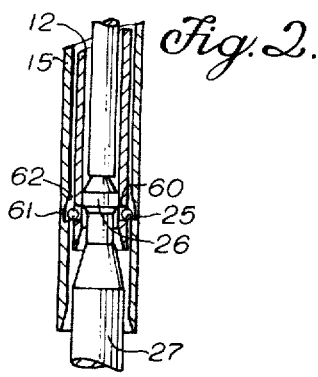
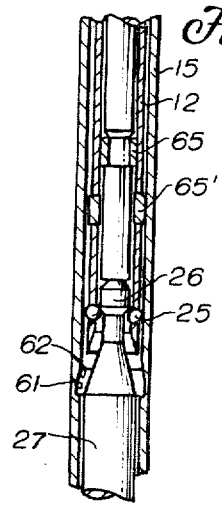
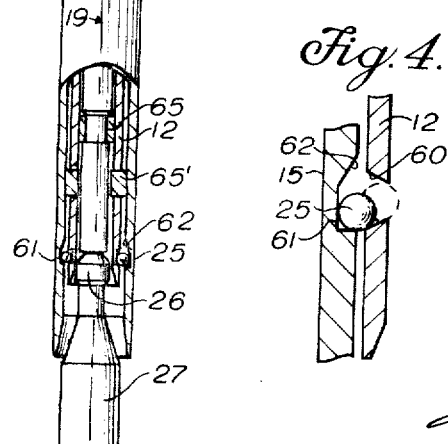
INVENTOR.
GLEN V. BRYNSVOLD
BY
ATTORNEY Aug. 22, 1967          G. V. BRYNSVOLD          3,337,257
                        GRAPPLING SYSTEM
Filed Oct. 7, 1965                              2 Sheets-Sheet 2
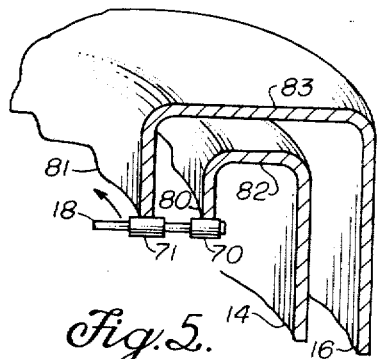
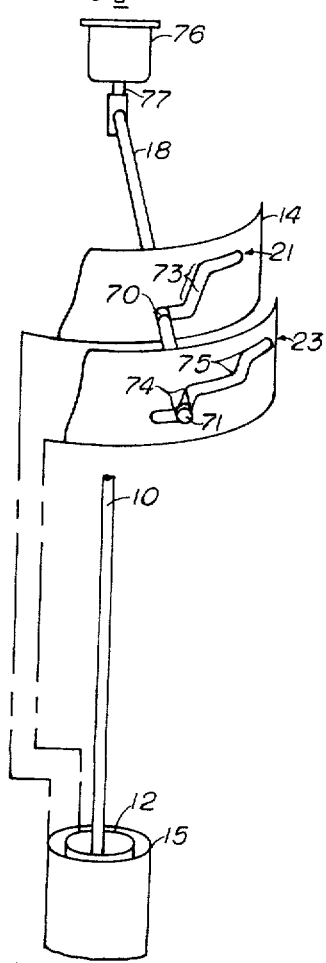
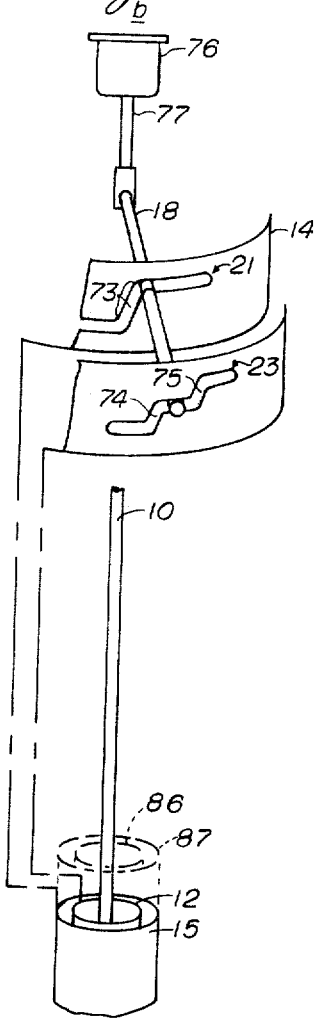
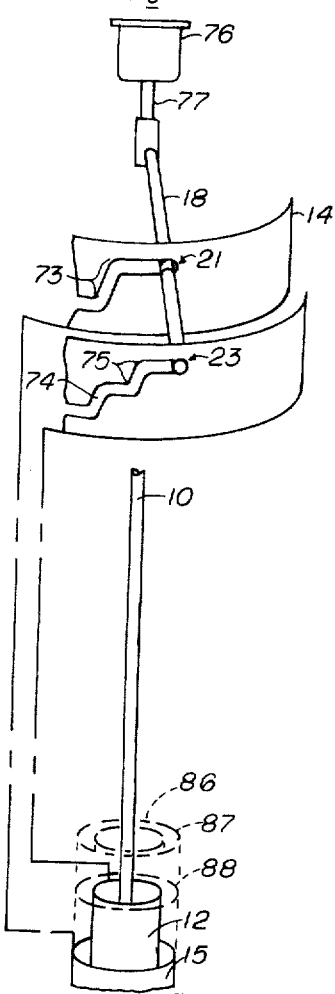
INVENTOR.
GLEN V. BRYNSVOLD
BY
ATTORNEY

United States Patent Office

3,337,257
Patented Aug. 22, 1967

3,337,257
GRAPPLING SYSTEM
Glen V. Brynsvold, San Jose, Calif., assignor to the United States of America as represented by the United States Atomic Energy Commission
Filed Oct. 7, 1965, Ser. No. 493,939
4 Claims. (Cl. 294—90)

ABSTRACT OF THE DISCLOSURE

A grappling system for a fuel rod and having concentric cylindriform rotating cams driving a cam follower connected to concentric sleeves. A ball coupling is located between the sleeves and is forced into position by said sleeves, engaging a knob on top of the fuel rod which is adapted to lift the fuel rod out of the core.

---

The invention described herein was made in the course of, or under, Contract No. AT(04–3)–540 with the United States Atomic Energy Commission.

This invention relates to grappling devices and systems and in particular to grappling systems that are manipulated from a remote position.

In nuclear reactors it is necessary to have means for removing and replacing fuel elements and control rods to maintain satisfactory operation of the reactor. With nuclear reactors using sodium and certain other materials, e.g., NaK, as a coolant and heat exchanging medium, the problem of removing fuel elements, control rods and the like is complicated by the fact that the sodium freezes, i.e., solidifies, around the grapple and item grasped causing release of the item to be uncertain. The devices of the prior art generally utilize fingers or clamps for grasping the rod but have difficulty in releasing the item grasped because of the hardened sodium encasing the fingers or clamps.

Summary of the invention

The grappling system of the present invention overcomes these uncertainties of release of the grasped item by providing concentric, axially movable sleeves incorporating wedge locking means in conjunction with a central rod to assure positive ejection of the grasped item.

It is therefore an object of this invention to provide a grappling system that may be operated from a remote point.

It is another object of this invention to provide a grappling system for a nuclear reactor which will operate when sodium is used as a coolant and heat transfer medium in the reactor.

It is a further object of this invention to provide a grappling system for a nuclear reactor that assures positive release of a grasped item when covered with solidified sodium.

Other and more particular objects of this invention will be manifest upon study of the following detailed description when taken together with the accompanying drawing in which:

Brief description of the drawing

FIGURE 1 is a longitudinal section through the grappling device of this invention showing the assembled arrangement of the parts.

FIGURE 2 is a longitudinal section through the grapple portion of the device showing the positioning of the parts in the unlatched position immediate to locking onto the object to be grasped.

FIGURE 3 is a longitudinal section through the grapple portion of the device showing the positioning of the parts in the locked position around the object to be grasped.

FIGURE 4 is a section through the ball locking arrangement showing in greater detail the positioning of the ball.

FIGURES 5a, b and c are schematic representatives of the stepped cam operation and configuration and its relation to the movable sleeves in the retracted, unlatched and locked positions, and FIGURE 6 is a section through a second embodiment of the cam configuration to permit continuous rather than cyclicly reversed rotation of the cam follower.

Description of the preferred embodiment

As seen from FIGURE 1 the preferred embodiment of the grappling device of this invention basically comprises actuating mechanism including a central rod 10 fastened in fixed relation to rotatable casing 11, and axially slidable first sleeve 12 coaxial with and concentric about central rod 10 and connected to a first cylindriform cam 14 and a similarly arranged configuration of an axially slidable second sleeve 15 coaxial with and concentric about first sleeve 12 and connected to a second cylindriform cam 16 arranged concentric with first cylindriform cam 14 within casing 11. Cam follower 18 is arranged to rotate about longitudinal axis 19 within casing 11 simultaneously driving both first cam 14 and second cam 16 up or down as determined by the shape of first and second races 21 and 23 in cams 14 and 16, respectively.

Proximate the lower end of sleeves 12 and 15 is a coupling means in the form of a ball locking arrangement (shown in FIGURE 1 in the unlocked and retracted position) in which balls 25 are wedged under a projecting portion of knob 26 or rod 27 (see FIGURE 3) to achieve a positive grip. The rod 27 may be a fissile fuel element or other component in the core of a nuclear reactor or other closed system which is to be manipulated (not shown). Positive ejection of rod 27 is achieved by providing means for retracting sleeves 12 and 15 from around knob 26 in such a manner that central rod 10 acts as a stationary push rod against the top of knob 26 to prevent upward movement of rod 27 when sleeves 12 and 15 are retracted.

In detail, still referring to FIGURE 1, an outer casing 30 is provided having upper and lower flanged end plates 31 and 32 fitted, respectively, with seals 33 to prevent sodium or the like from entering and fouling or interfering with the operating parts of the grapple cam actuating mechanism. Casing 30 acts to support the entire grappling assembly and may be suspended by a cable, or like means from a bridge crane (not shown) or the like (not shown). Inner casing 11 is arranged concentric within outer casing 30 to rotate about axis 19 and acts as a housing for the sleeve lifting mechanism. Lower support bearing 41 is arranged concentrically about an opening in lower end plate 32 for antifriction support of rotatable inner casing 11 while upper bearing 42 is carried by casing 30, for example, by annular plate 39 to arrange for rotatable support for inner casing drive shaft 43 and as antifriction support for the upper end of casing 11. The drive shaft 43 is arranged to transmit torque from a powered drive unit 44 e.g., enclosed gear head motor which is affixed by plate 31, to casing 11 to achieve rotation of casing 11 about longitudinal axis 19. Thus inner casing 11 can be caused to rotate relative to outer casing 30. A rotation position indicating switch 45 is provided with the actuating portion in contact wth shaft 43 to electrcally signal the rotational position of shaft 43 for display of the information on a control panel (not shown). Any suitable means such as circumferentially spaced raised portions 46 (or detent holes) on shaft 43 may be used to actuate switch 45 with the making or interruption of an associated electrical circuit (not shown) providing the indicating signal.

Within rotable inner casing 11 is housed the main operating mechanism for raising and lowering sleeves 12 and 15. In the preferred embodiment of this invention central rod 10 is held in fixed relation to rotable casing 11 by support rod 50 affixed at the ends to extend transversely within the lower portion of casing 11 and is attached centrally to the upper end of central rod 10 by bolts 51 or the like. Support rod 50 additionally performs as an alignment guide in longitudinal guide slot 52 provided in concentric cylindriform cam sleeves 14 and 16 to permit vertical movement at the same time preventing rotational movement of cams 14 and 16. The cam sleeves 14 and 16 are linked as by means of discs 53 and 54 to the upper ends of sleeves 12 and 15, respectively within casing 11. The purpose of cylindriform cams 14 and 16 is to obtain a particular stepped motion in relation to central rod 10 of first sleeve 12 and second sleeve 15. For the embodiment described herein, three stepped motion positions are required to provide in the grapple portion, respectively, the following: (1) A retracted position, as illustrated in FIGURE 1; (2) an unlatched position, as illustrated in FIGURE 2; and (3) A locked position as illustrated in FIGURE 3.

Referring to FIGURE 1 and more particularly to the lower end of sleeves 12 and 15 and central rod 10 forming the gripping portion of the grappling device, sleeves 12 and 15 are here shown in the fully retracted condition as it would be when ready for movement away from the rod just manipulated. In this position the lower end of central rod 10 is positioned to rest on top of knob 26 of typical rod 27 and the ball 25, disposed in infundibulum 60 which penetrates the lower portion of first sleeve 12, is retracted into ball recess 61 in second sleeve 15.

FIGURE 4 is an enlarged view of the ball retaining portion of sleeves 12 and 15 and more clearly illustrates the shape and arrangement of the ball locking means parts. Infundibulum 60 is a funnel shaped hole which permits ball 25 to project beyond the inside face of sleeve 12 but necks down to a diameter slightly less than that of ball 25 to prevent it from passing completely through. Ball recess 61 can be a groove in the inside face of sleeve 15 of a depth less than the diameter of ball 25, so that ball 25 will rest on the lower lip of infundibulum 60 and move up or down with sleeve 12 but not move up or down with sleeve 15. Slanting sides 62 of ball recess 61 are for the purpose of providing a horizontal component wedging force forcing ball 25 into infundibulum 60 and project beyond the inside face of sleeve 12 when sleeve 15 is lowered relative to sleeve 12. Several balls may be arranged circumferentially about first sleeve 12 in a similar manner. In the preferred embodiment four balls are used.

Referring now to FIGURE 2 showing the grappling end of sleeves 12 and 15 in the unlocked position, both sleeves 12 and 15 have been simultaneously lowered or extended to encincture knob 26. In this position balls 25 in infundibulae 60 in first sleeve 12 remain retracted into ball recess 61 in second sleeve 15. This position permits alignment of sleeves 12 and 15 over the cylindrical surfaces 26 and 27 of rod 27 in preparation for the locking action to follow.

Referring to FIGURE 3 showing the gripping end of sleeves 12 and 15 in the locked position, second sleeve 15 has now been moved in stepped axial position relative to first sleeve 12 and central rod 10. Inwardly slanting sides 62 in the upper portion of ball recess 61 in second sleeve 15 are arranged to exert a horizontal component wedging force against balls 25 driving them under knob 26 or rod 27 within infundibulae 60 until the linear inner wall of sleeve 15 retains the balls 25 therein. Thus rod 27 is firmly grappled and may be lifted and moved as desired. Although the downward forces caused by the weight of rod 27 will tend to force balls 25 radially outward, the inner wall of second sleeve 15 will prevent their movement thus maintaining the wedging action of balls 25 to firmly hold knob 26 of rod 27. To assure the balanced wedging action of balls 25, guide bearing bushings 65 and 65' are provided between central rod 10 and first sleeve 12, and sleeve 12 and second sleeve 15 respectively to maintain accurate alignment of the parts.

To release the grapple from rod 27 the above steps are reversed. Second sleeve 15 is retracted upwardly to permit balls 25 to retreat into recess 61 and then both first sleeve 12 and second sleeve 15 are simultaneously retracted upwardly to free them from knob 26 and rod 27. It can be seen that any solidified sodium on rod 27 or the grapple will not interfere with its operation since only positive motions which place the solidified sodium film in shear, rather than tension, are used. In addition, the force necessary to shear the bond of solidified sodium which may enter the gripping portion of the grapple is directed to compress against knob 26 by central rod 10 thus preventing upward movement of rod 27 should sleeves 12 and 15 become stuck by solidified sodium to rod 27.

To more clearly depict the operation of the stepped motion means for raising and lowering sleeves 12 and 15, FIGURES 5a, b and c illustrate, schematically, the general arrangement of cams 14 and 16 and their relation to sleeves 12 and 15 as one identical half of a bisymmetrical configuration.

First cylindriform cam 14 and second cylindriform cam 16 are shown in FIGURES 5a, b and c as concentric cylindrical shell segments having slots defining a first cam race 21 and a second cam race 23, respectively therein. To achieve stepped motion, cam races 21 and 23 are provided with a first step cam incline, i.e., 73 in race 21, and 74 in race 23. Second cam race 23 is also provided with second step incline 75. It will be appreciated that the foregoing will be duplicated in the other half or the bisymmetrical arrangement.

A first cam follower roller 70 is arranged to ride in race 21 while a second cam follower 71 is arranged to ride in race 23. Both rollers 70 and 71, arranged as antifriction bearing means, will be duplicated as proximate both ends of cam follower 18, although shown in this schematic representation, at only one end of follower 18. Cam races, identical to races 21 and 23, are provided in diametrically opposite races 21 and 23 but are not shown in this simplified schematic illustration. A cam follower drive 76 is arranged to rotate cam follower 18 through cam follower drive shaft 77 extending axially therein.

Cam follower drive 76, e.g., a gear head motor is affixed to drive unit plate 78 which in turn is affixed to casing 11 as by bolts, screws, welding or the like. Drive shaft 77 is arranged to extend through hole 69 in plate 78 and is supported downwardly from drive 76 by antifriction bearings 79 which are held in place by bearing support plate 72. Thus cam follower 18, which affixed to drive shaft 77, will rotate relative to inner casing 11 and independently of outer casing 30. Limit switches 66 and 67 are provided which are activated by the movement of cams 14 and 16 to indicate, through the interruption of electrical circuitry (not shown) the positions of cams 14 and 16 on a control panel (not shown).

Referring more particularly to FIGURE 5a, the configuration of cams 14 and 16 are in the first step position with sleeves 12 and 15 fully retracted. In this position (see FIGURE 1 and FIGURE 4) balls 25 are in recess 61 of sleeve 15. Central rod 10 is abutting knob 26 of rod 27 preparatory to grasping the rod. Referring again to FIGURE 5a, cam follower 18 is at one end of both races 21 and 23.

Referring now to FIGURE 5b, cam follower 18 has now rotated to a position along cam race 21 and 23 past first cam first step incline 73 and second cam first step incline 74. Since incline 73 and 74 are radially aligned, as cam follower 18 travels along races 21 and 23, cams 14 and 16 will move downward, simultaneously lowering sleeves 12 and 15 to incincture knob 26 on rod 27 (FIGURE 2). In FIGURE 5b, the original position of sleeves 12 and 15 are shown by dashed lines 86 and 87 respectively.

Referring now to FIGURE 5c, cam follower 18 has now rotated to a position along cam races 21 and 23 past second cam second incline 75. Since there is no second step incline in first cam race 21, first cam 14 will not move downward any further. However, due to second step incline 75 in second cam race 23, second cam 16 will move downward, lowering second sleeve 15 and (referring to FIGURE 3) causing balls 25 to be wedged under knob 26 locking the grappling device onto rod 27. In FIGURE 5c, dashed line 88 illustrates the position of sleeve 15 prior to its downward movement.

To release the grapple, cam follower 18 is rotated in the opposite direction thus reversing the above enumerated steps.

In the preferred embodiment, central rod 10 is shown in fixed relation to inner casing 11. It can be seen that central rod 10 may also be connected to a cam arranged to be driven by a common rotating cam follower to achieve axial motion relative to not only sleeves 12 and 15 but also to inner casing 11.

It can also be seen that the reason for reversed rotation of cam follower 18 to release the grappling device in the preferred embodiment is due to the necessity for structural connection of the upper part of cams 14 and 16 to their lower part which is attached to sleeves 12 and 15 respectively. Since cam races 21 and 23 are in the form of slots through cylindriform cams 14 and 16, some material must remain between the ends of the diametrically opposite cam races for structural reasons.

A cross section of a cam configuration which permits continuous rotation in one direction of cam follower 18 is shown in FIGURE 6. In this embodiment the top lip of first cam 14 is returned to form continuous first race 80 and the top lip of second cam 16 is returned to form continuous second race 81. The distance between fixed cam bent portion 82 proximate the top of first cam 14 and second cam bent portion 83 proximate the top of second cam 16 must be adjusted for the maximum differential movement defined by continuous first race 80 and continuous second race 81.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

What is claimed is:

1. A grappling system comprising, in combination, means defining a rigid support casing, means defining an elongated casing rotatable about the longitudinal axis thereof within said support casing, a central rod associated with said elongated casing and axially aligned and protruding from one end of said rigid support casing and said elongated casing, a first sleeve means arranged in axially slidable relation concentric with said central rod, a second sleeve means arranged in axially slidable relation concentric around said first sleeve, drive means associated with said central rod, first sleeve and second sleeve for generating relative axial movement between said central rod, first sleeve and second sleeve, and means including a releasable coupling actuated by relative movement between said first and second sleeves.

2. The grappling system as defined in claim 1 wherein said releasable coupling actuated by relative movement between said first and second sleeves comprises wedge means associated with said first sleeve for releasably gripping an object and means associated with said second sleeve for actuating and releasing said wedge.

3. The grappling system as defined in claim 1 wherein said releasable coupling actuated by relative movement between said first and second sleeves comprises ball wedge means associated with said first sleeve, means associated with said second sleeve and motivated when said sleeve is extended to its outermost limit, to actuate said ball wedge means into gripping position and ball wedge release means actuated by said second sleeve when said sleeve is retracted to its innermost limit relative to said first sleeve.

4. A grappling system comprising, in combination, means defining an elongated support casing rotatable about the longitudinal axis thereof, a central rod associated with, axially aligned and protruding from one end of said support casing, a first sleeve means arranged in axially slidable relation with said central rod, a second sleeve means arranged in axially slidable relation around said first sleeve, actuating means associated with said first sleeve and said second sleeve and including said central rod in a fixed relation therein, said actuation mean having means including a first cylindriform cam associated with said first sleeve, a second cylindriform cam associated with said second sleeve concentric with said first cylindriform cam, cam follower means simultaneously engaging said first and second cams and drive means for rotating said cam follower to generate axial movement between said fixed central rod, first sleeve and second sleeve, and means including a releasable coupling actuated by relative movement between said first and second sleeves.

References Cited
FOREIGN PATENTS
1,233,492 5/1960 France.
936,453 9/1963 Great Britain.

GERALD M. FORLENZA, *Primary Examiner.*

G. F. ABRAHAM, *Assistant Examiner.*